US011965381B2

(12) United States Patent
Lombardini

(10) Patent No.: US 11,965,381 B2
(45) Date of Patent: Apr. 23, 2024

(54) UPRIGHT FOR A SHADING SYSTEM

(71) Applicant: PLASTEX SA, Madonna del Piano (CH)

(72) Inventor: Marco Lombardini, Vernate (CH)

(73) Assignee: PLASTEX SA, Madonna del Piano (CH)

( * ) Notice: Subject to any disclaimer, the term of this patent is extended or adjusted under 35 U.S.C. 154(b) by 0 days.

(21) Appl. No.: 17/276,886

(22) PCT Filed: Oct. 19, 2018

(86) PCT No.: PCT/IB2018/058126

§ 371 (c)(1),
(2) Date: Mar. 17, 2021

(87) PCT Pub. No.: WO2020/079476

PCT Pub. Date: Apr. 23, 2020

(65) Prior Publication Data

US 2021/0348446 A1 Nov. 11, 2021

(51) Int. Cl.
*E06B 9/58* (2006.01)

(52) U.S. Cl.
CPC .......... *E06B 9/58* (2013.01); *E06B 2009/587* (2013.01)

(58) Field of Classification Search
CPC ...... E06B 9/58; E06B 9/581; E06B 2009/585; E06B 2009/587; E06B 9/582; E06B 2009/588
See application file for complete search history.

(56) References Cited

U.S. PATENT DOCUMENTS

| | | | | |
|---|---|---|---|---|
| 9,458,666 | B2 * | 10/2016 | Murray | E06B 9/581 |
| 9,512,673 | B2 * | 12/2016 | Dibben | E06B 9/58 |
| 10,920,489 | B2 * | 2/2021 | Lombardini | E06B 9/58 |
| 2015/0345215 | A1 * | 12/2015 | Roberts | E06B 9/582 160/368.1 |
| 2017/0297419 | A1 * | 10/2017 | Ten-Jet-Foei | B60J 1/2061 |
| 2018/0187483 | A1 * | 7/2018 | Berman | E06B 9/581 |
| 2018/0283098 | A1 * | 10/2018 | Foley | E06B 9/327 |

FOREIGN PATENT DOCUMENTS

| | | | |
|---|---|---|---|
| WO | 2011009160 | A1 | 1/2011 |
| WO | 2013128160 | A1 | 9/2013 |
| WO | 2016193103 | A1 | 12/2016 |

OTHER PUBLICATIONS

International Search Report from International Application No. PCT/IB2018/058126 dated Jul. 3, 2019.

* cited by examiner

*Primary Examiner* — Daniel P Cahn
*Assistant Examiner* — John W Hanes, Jr.
(74) *Attorney, Agent, or Firm* — Dorsey & Whitney LLP

(57) ABSTRACT

An upright (1) comprising two sidewalls (2, 3) between which a profiled element (100) for a shading system can be inserted, and an end wall (6) between the two sidewalls (2, 3). The upright is characterized in that one of the sidewalls is removable, and elastic means (200) are arranged between the removable sidewall (2) and the non-removable sidewall (3), in order to retain the removable sidewall (2) between the end wall (6) and the non-removable sidewall (3).

14 Claims, 8 Drawing Sheets

UPRIGHT FOR A SHADING SYSTEM

FIELD OF APPLICATION

The present invention relates to an upright comprising two sidewalls between which a profiled element for a shading system can be inserted, said profiled element being for example intended to receive the edge of a shading cloth which extends as far as the profiled element of an upright arranged opposite.

The present invention also relates to a removable sidewall of the aforementioned upright, designed to allow fitting or removal of the profiled element through an opening of the upright.

The present invention also relates to means for joining together the upright and the removable sidewall.

PRIOR ART

An upright for a shading system is formed by an end wall, by two sidewalls and by an opening which is situated opposite the end wall and across which a shading cloth is slidable.

FIG. 1 is a cross-sectional view of an upright 90 according to the prior art. A sidewall 70 is incorporated in the upright 90 and an oppositely arranged sidewall 80 is removable, so that the profiled element (not shown) of the shading system may be fitted into or removed from a seat S in the upright 90. The seat S has an opening A with a width corresponding to the distance between the sidewalls 80, 70, and in particular to the distance between front portions 71, 81 of the sidewalls, which form the front face 92 of the upright 90*a* and which, during use, form a profile for retaining the profiled element. The opening A is also the opening of the upright 90.

In the known uprights 90, the removable sidewall 80 is fixed to a frame 91 of the upright 90 by means of screws which pass through the front portion 81 and engage inside respective threaded holes 93 in the frame.

FIG. 1*a* shows a horizontally sectioned view of two uprights 90 according to the prior art, arranged in position inside two respective seats formed in a wall 999, on the sides of an opening A'. In particular, the end wall 6 of the uprights is set inside the wall 999 and the front face 92 is flush with the wall 999. A profiled element 100 is mounted inside each upright 90 and has, extending therefrom towards the profiled element 100 of the oppositely arranged upright, a cloth for blocking the light passing through the opening A'.

The known uprights 90 have a number of drawbacks. In fact, the aforementioned structure not only complicates and slows down assembly, owing to the laborious operation needed to fit the removable sidewall 80, but also requires a large installation seat inside the wall 999 due to the dimensions of the frame 91 and the threaded holes 93 inside the upright.

The technical problem forming the basis of the present invention is to devise an upright for a shading system, an associated removable sidewall, and associated means for joining together the removable sidewall and the upright, which overcome the problems mentioned above, speeding up and simplifying the assembly and disassembly operations, reducing the costs for production of the upright, while also improving its structure and its aesthetic appearance, so that it occupies less space and therefore does not have all the drawbacks which affect the shading uprights according to the prior art.

SUMMARY OF THE INVENTION

The idea forming the basis of the present invention is to devise a sidewall which can be rapidly engaged in and removed from the upright, associating quick engaging and release means with the end wall of the upright so that its size may be reduced.

According to the proposed solution described above, the technical problem underlying the present invention is solved by an upright according to one of claims 1-17.

DETAILED DESCRIPTION

Figure 1:
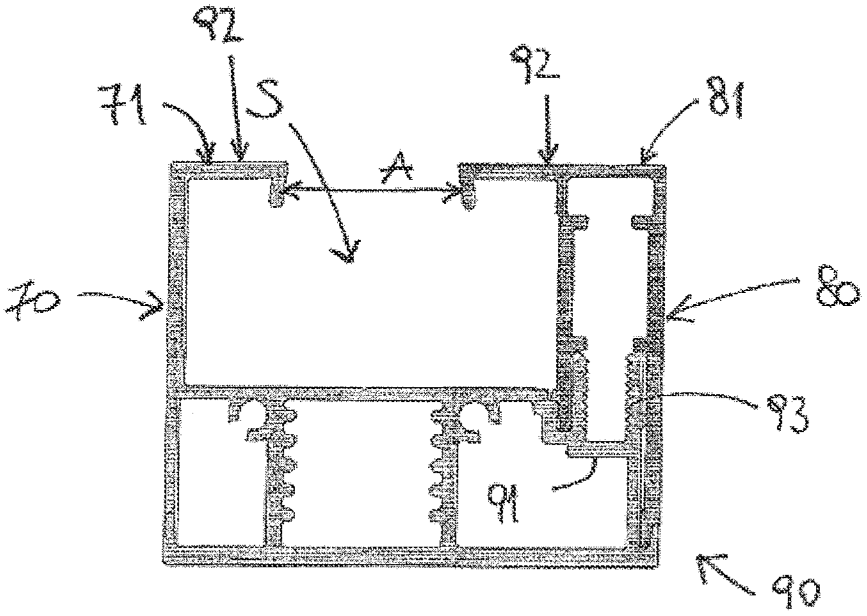
Fig. 1 (Prior Art)
FIG. 1 is a cross-sectional view of an upright for a shading system according to the prior art.
Figure 1A:
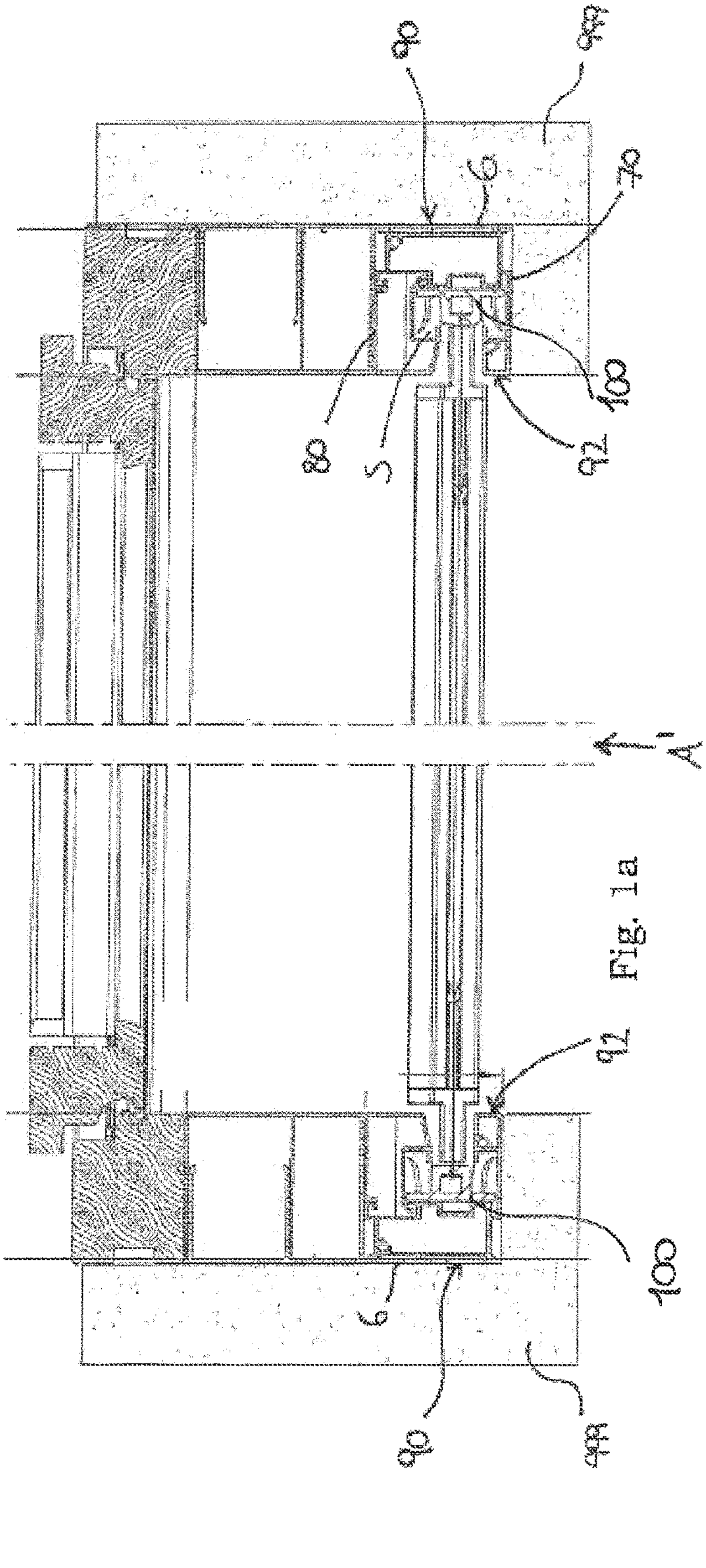
FIG. 1*a* is a cross-sectional view of two uprights according to the prior art.
Figure 2:
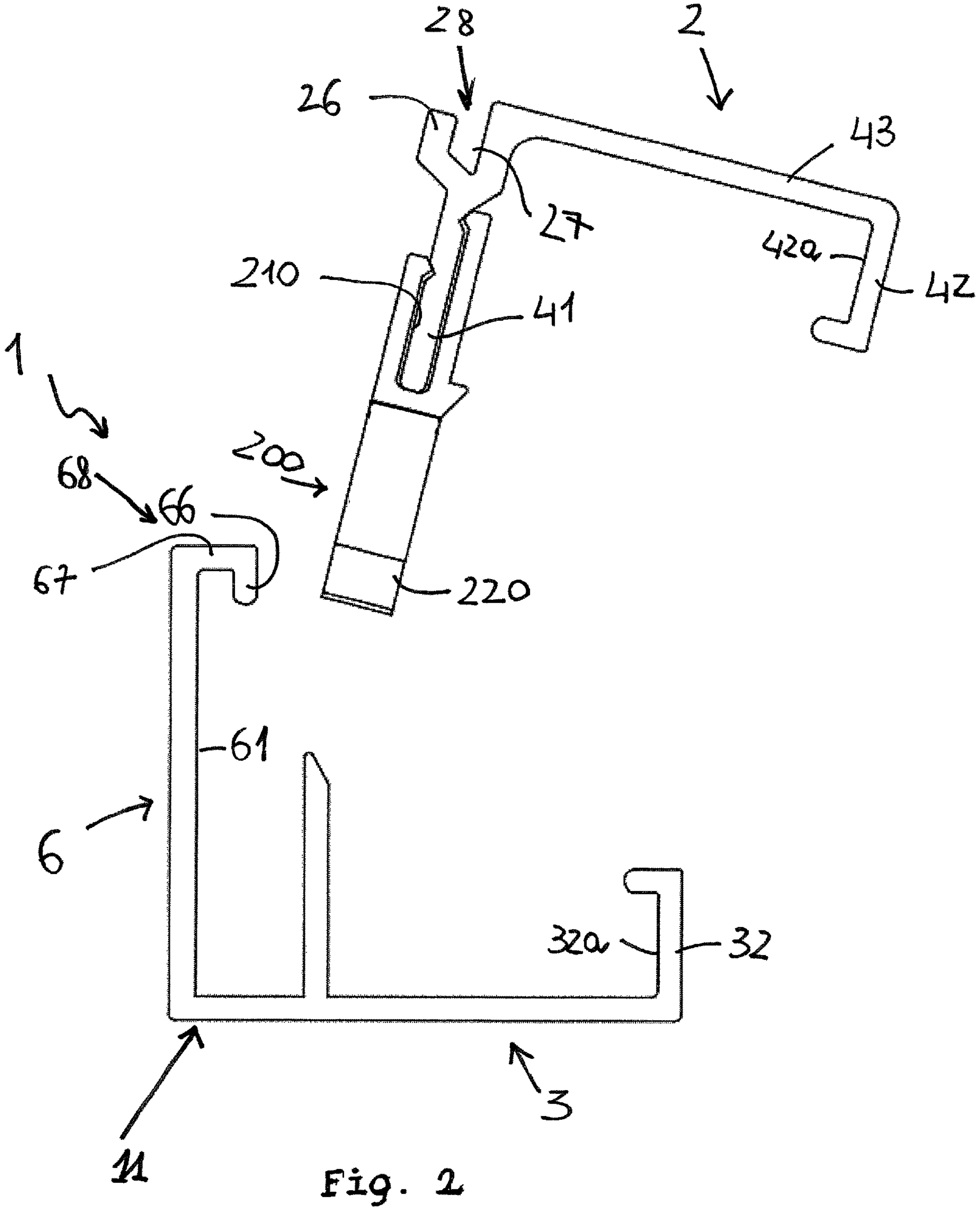
FIG. 2 is a cross-sectional view of an upright for a shading system according to the present invention, with a sidewall removed.
Figure 7:
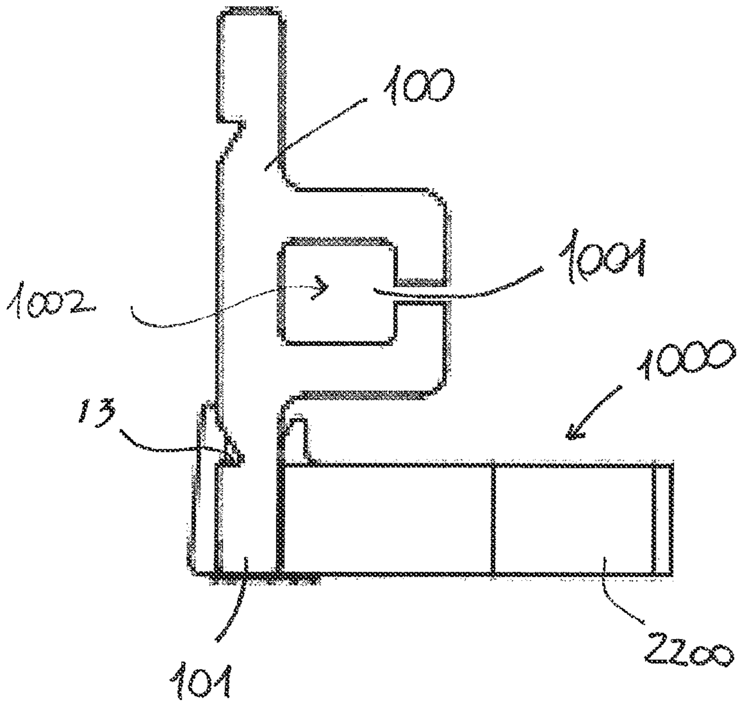
FIG. 7 is a cross-sectional view of a profiled element of the shading system.

With reference to FIG. 2 this shows in schematic form, indicated by the reference number 1, an upright according to the present invention, and in particular an upright 1 for a shading system intended to be fixed (for example) to a wall or a ceiling and to receive inside it a profiled element (FIG. 7) for retaining a shading cloth (not shown).

The upright 1 comprises two sidewalls 2, 3 between which the profiled element 100 can be inserted, an end wall 6 between the two sidewalls 2, 3 and an opening 10 (FIG. 4) which is situated opposite the end wall 6 and through which the shading cloth is slidable.

The upright 1 may be fixed to the wall, for example, by means of screws mounted through the sidewall 3 or through the end wall 6. As regards the type of application, different methods for fixing the upright 1 to the wall or to a different mounting surface, for example by means of glue or a double-sided adhesive strip applied onto the end wall 6 or onto the sidewall 3, and if need be onto the application surface, are envisaged.

The shading cloth is slidably associated with the profiled element 100, with one edge of the cloth retained inside a seat 1002 of the profiled element 100 and the remaining portion of the cloth which protrudes from an opening 1001 of the profiled element, extending as far as an opposite edge of the cloth, slidable inside the profiled element 100 of an opposite upright 1.

Figure 4:
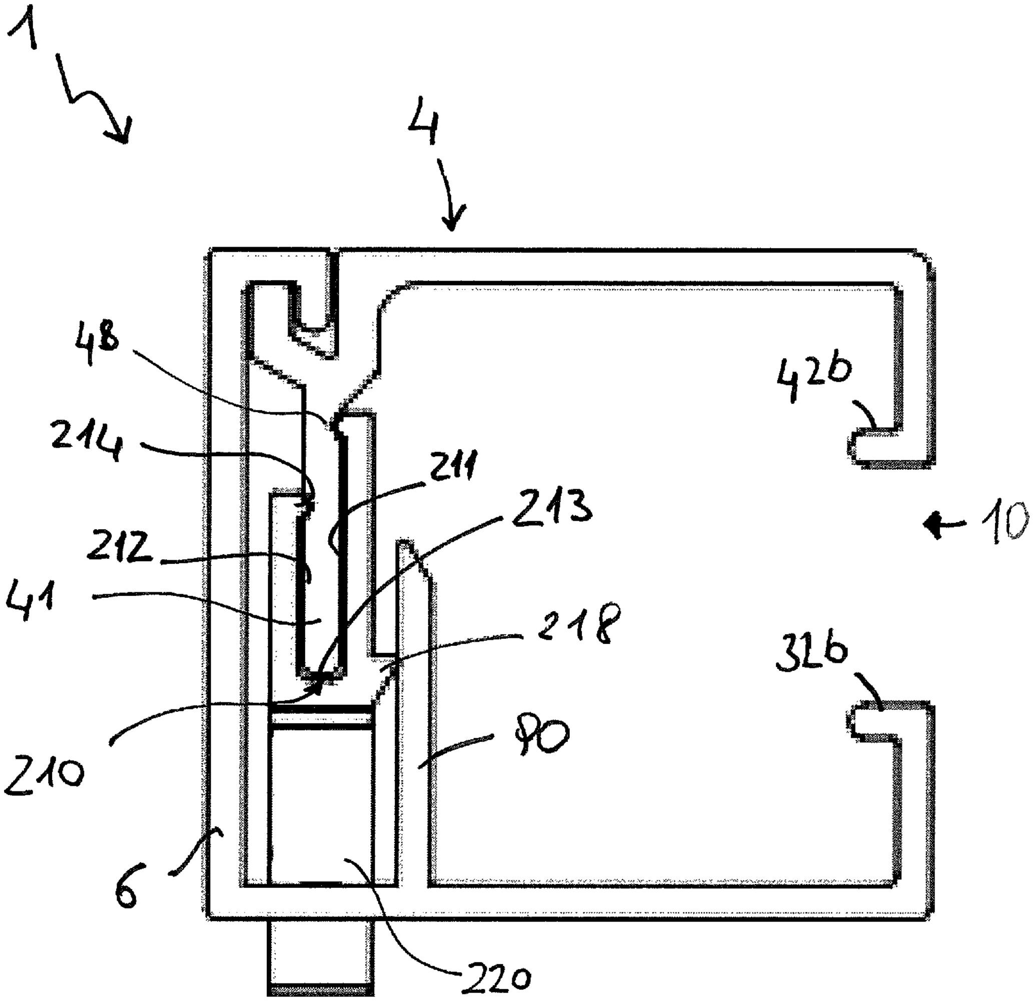
FIG. 4 is a cross-sectional view of the upright according to FIG. 1, with the sidewall fitted.

Obviously, it is quite possible for the upright 1 according to the present invention to be used in combination with profiled elements which have structural characteristics different from those of the profiled element shown in FIG. 4, also with regards to positioning of the shading element.

According to the present invention, one of the sidewalls 2 of the upright 1 is removable and elastic means 200 are arranged between the removable sidewall 2 and the non-removable sidewall 3, so as to retain the removable sidewall 2 between the end wall 6 and the non-removable sidewall 3. In particular, the elastic means 200 are extendable and compressible along a compression axis parallel to the end wall 6; owing to this association of the elastic means 200 with the end wall 6 it is possible to reduce the lateral dimension of the upright 1, facilitating installation in the respective wall seat and improving the aesthetic appearance thereof.

In FIG. 2 the removable sidewall 2 is detached from the upright 1. Once the non-removable sidewall 3 or end wall 6 of the upright 1 has been fixed to the wall and, if appropriate, once the profiled element 100 has been inserted inside the upright 1, mounting of the removable sidewall 2 is significantly simplified and is described hereinbelow with reference to a preferred embodiment of the present invention.

In particular, the upright 1 comprises a profile 68 for retaining the removable sidewall 2 and the removable sidewall 2 comprises a locating profile 28 which can be joined together with the retaining profile 68 of the end wall 6. The retaining profile 68 may be provided on the end wall 6 of the upright, in particular on an edge or in any case on a side portion of the end wall 6, and the locating profile 28 may be provided on a lateral portion or edge of the removable sidewall 2.

Preferably the elastic means 200 are fixed to the removable sidewall 2.

In order to fix the removable sidewall 2 to the upright 1, the elastic means 200 are brought into contact with the non-removable sidewall 3 and compressed against it, pushing the removable sidewall 2 towards the non-removable sidewall and positioning the locating profile 28 underneath the retaining profile 68. Then the non-removable sidewall is released, allowing extension of the elastic means 200 and therefore engagement of the two profiles 28, 68.

In order to disengage the parts (removable sidewall 2 and end wall 6), first a pressure is exerted on the elastic means 200, i.e. pushing again the removable sidewall 2 towards the non-removable sidewall 3, thus moving the locating profile 28 away from the retaining profile 68; then the locating profile 28 is displaced laterally (i.e. towards the opening 10 in the upright) so as to allow release of the elastic means 200 without interference with the retaining profile 68 and therefore removal of the removable sidewall 2 from the upright 1.

In the embodiment shown in FIG. 2, the locating profile 28 of the removable sidewall 2 has a U-shaped section and can be joined by means of snap-engagement inside an upside U section of the retaining profile 68 of the end wall 6.

In particular, the upright 1 may have a retaining profile 68 formed by a wall 67 protruding from the end wall 6 and corresponding to a base 67 of the overturned U section, preferably parallel to the non-removable sidewall 3 and extending towards the opening 10 of the upright 1, and a tooth 66 extending towards the non-removable sidewall 3, preferably parallel to a base 61 of the end wall 6.

The locating profile 28 of the removable sidewall 2 comprises a tooth 26 and a recess 27, the tooth 26 being inserted inside the overturned U section of the end wall 6, and the tooth 66 of the retaining profile 68 of the end wall 6 being engaged inside the recess 27 of the locating profile 28.

According to the embodiment shown in FIG. 2, the elastic means 200 are mounted on a flange 41 of the removable sidewall 2, which is situated opposite the U-shaped section and extends from the base of the U-shaped section towards the non-removable wall 3, over a distance for example corresponding to about half the end wall 6.

When the parts are assembled the flange 41 is parallel to the end wall 6 and extremely close thereto. Similarly, the elastic means 200 mounted on the flange 41 are extremely close to the end wall 6. The elastic means 200 are mounted on one end of the flange 41 and have a compression and release axis aligned with the flange 41.

Even more particularly, according to the embodiment shown in FIG. 2, mounting of the removable sidewall 2 is performed by positioning one end of the elastic means 200 inside an angular portion 11 of the upright 1 where the end wall 6 and the non-removable wall 3 meet. This mounting operation is performed by inclining a front face 42 of the removable sidewall 2 towards the non-removable sidewall 3 (reducing temporarily the front opening 10 of the upright 1) so as to allow the locating profile 28, and in particular the tooth 26, to pass through underneath the retaining profile 68.

The elastic means 200 may be made of plastic or metallic material.

According to various embodiments, the elastic means 200 are formed as one piece with the removable sidewall 2 or are mounted thereon. Several elastic means may be mounted on or formed as one piece with the removable sidewall 2 at a fixed or variable interval.

In a preferred embodiment, the elastic means 200 comprise a flexible tongue 220 which can be compressed in order to perform the operations of releasing and engaging the removable sidewall 2 from/with the end wall 6 and can be extended in order to fix the removable sidewall 2 to the end wall 6.

For example the elastic means 200 may be mounted on the flange 41 of the removable sidewall 2 by means of a guide channel 210, preferably formed as one piece with the elastic means 200. The flexible tongue 220 has one end located on the channel 210 and an opposite end which is spaced therefrom and in contact with the non-removable sidewall 3. It is quite possible to use other means for joining together the elastic tongue and the flange 41, for example a hole in the flange 41 and a pin which projects from the tongue and can be inserted in the hole of the flange 41. Vice versa, a hole may be formed in the tongue and a pin provided on the flange. Alternatively, the tongue may be glued onto the flange.

According to embodiments, the tongue 220 or a distal portion thereof is mounted directly on the removable sidewall, for example on the base of the U-shaped section. It is also envisaged that the tongue(s) formed as one piece with the removable sidewall 2 may have a certain excess length, thus allowing them to be reduced in size, depending on the applications, for example keeping in reserve a greater length for greater compression, and therefore more stable fixing, or allowing the length of the tongue to be adjusted depending on the distance between the sidewalls 2, 3.

In the non-limiting example shown in FIG. 4, the guide channel 210 comprises two opposite faces 211, 212 making contact with opposite surfaces of the flange 41, and a tip 214 on at least one face 211, 212 which engages inside a recess 48 in the flange 41. Mounting of the channel is performed by guiding the channel 210 onto the flange 41 and then fitting the channel 210 so that the tip 214 snap-engages inside the recess. Preferably, two recesses are provided on the opposite surfaces of the flange 41 and two tips are provided on opposite faces 211, 212 of the channel.

According to an embodiment, the base 213 of the channel 210 between the faces 211, 212 makes contact with a distal portion of the flange 41.

In one embodiment of the present invention, the upright 1 comprises a shoulder 90 parallel to the end wall 6 and defining together with the end wall 6 a seat for the elastic means 200. This seat preferably receives at least partly also the flange 41. The shoulder 90 projects from the non-removable sidewall 3. For example, the shoulder terminates close to halfway along the end wall 6. A spacer 218 directed towards the shoulder 90 may be provided on the channel 210 in order to ensure correct positioning and operation of the elastic means 200 inside the respective seat.

Figure 3:
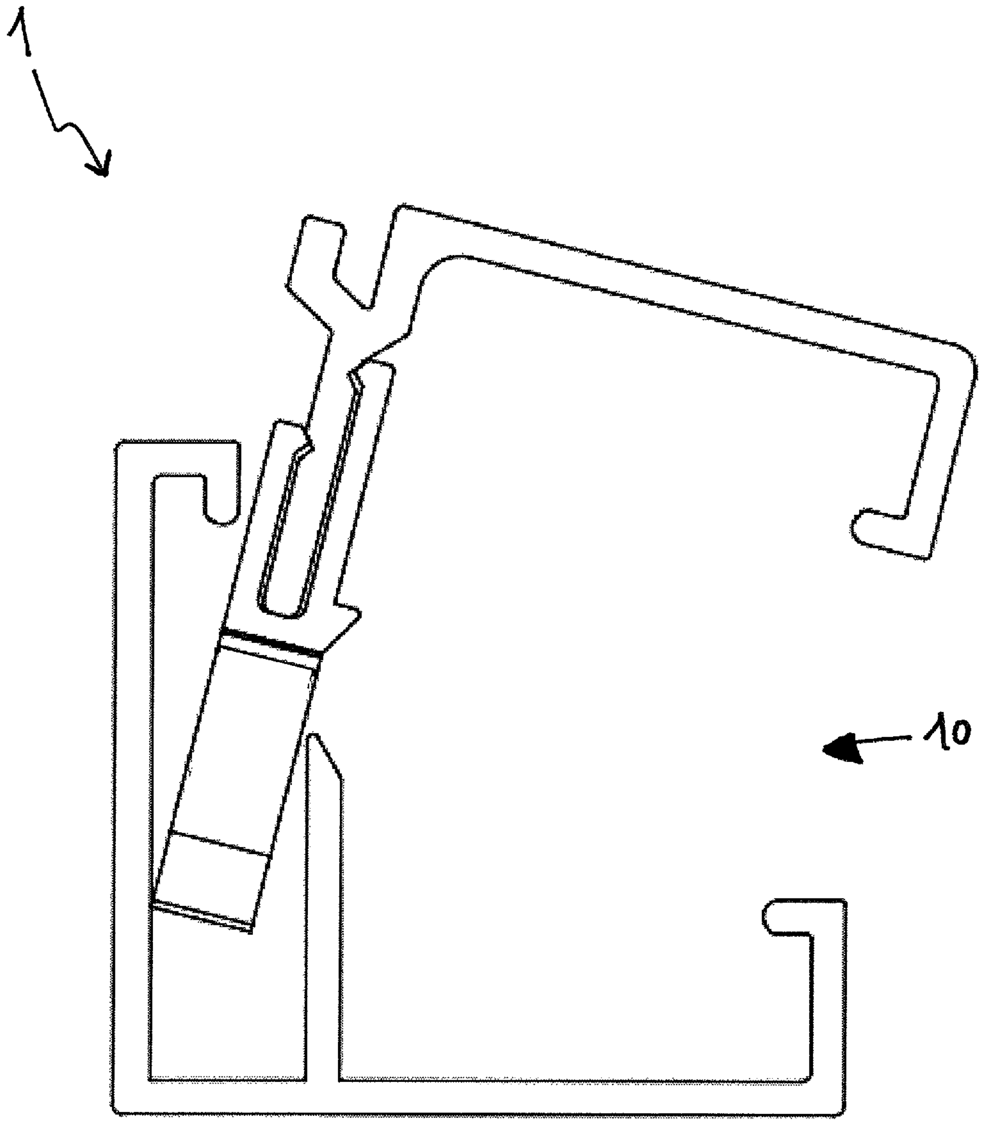
FIG. 3 is a cross-sectional view of the upright according to FIG. 1 during fitting of the removable sidewall.

The removable sidewall 2 also comprises a front face 42 which defines a front profile of the upright 1. Advantageously, the profile is without any holes and has an attractive appearance. Similarly, the non-removable sidewall 3 also comprises a respective face 32 and defines the front profile of the upright 1 which is without holes. The space between the two faces corresponds to the front opening 10 of the upright. In the embodiment shown in FIGS. 2-4, the faces 32, 42 comprise a surface parallel to the base of the end wall 6. A respective inset shoulder 32*b*, 42*b*, which is preferably parallel to the side surface of the sidewalls 2, 3, extends inside the upright; this inset shoulder has the function of retaining cushioning means 2200 for the profiled element 100.

According to a variation of embodiment, at least one of the front faces 42, 32, for example the face 42 (FIG. 5), comprises a surface with an inclination greater than or equal to 90° with respect to a side surface 43, 44 of the respective sidewall 2, 3.

Preferably, the surface with an inclination greater than or equal to 90° extends as far as a slit 1001 in the profiled element 100 where the shading cloth is mounted or halfway along the end wall 6.

Figure 5:
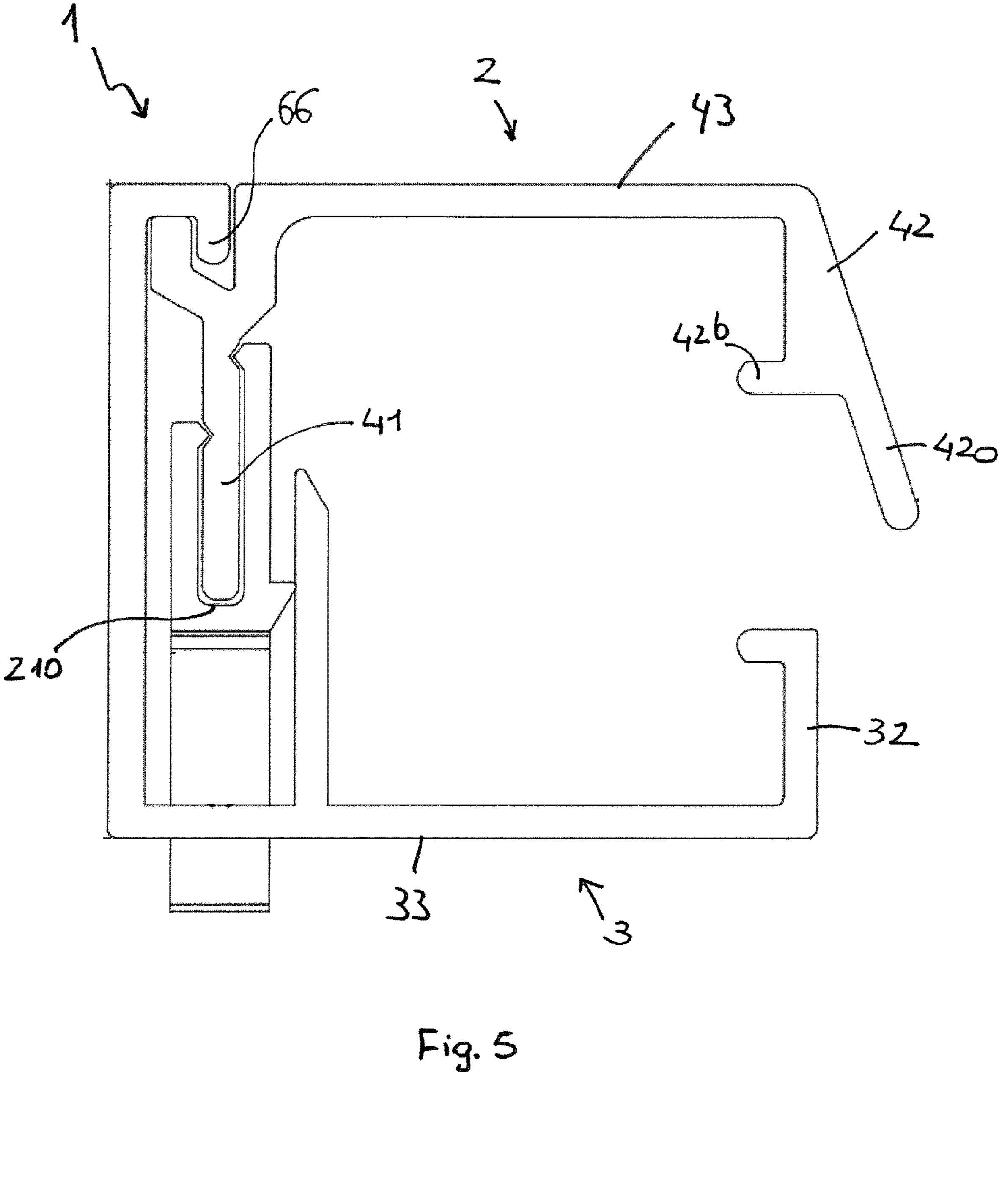
FIGS. 5 and 6 are cross-sectional views of some variations of embodiment of the upright according to the present invention.

For example, with reference to the example shown in FIG. 5, the surface of the face 42 has an inclination of about 120° with respect to the side surface 43 and extends beyond the inset shoulder 42*b*, while the surface of the face 32 has an inclination of 90° with respect to the side surface 33 and terminates at the inset shoulder 32*b*.

The extension 420 of the front face 42 forms a shading profile which prevents light passing through the upright, allowing complete shading of the environment. Moreover, the extension 420 forms a guiding profile for the cloth, reducing advantageously the possibility of displacement of the locating profiles, even in the presence of wind or sudden movements of the shading cloth.

In other words, one or both the faces 42, 22 of the upright 1 may form a profile for retaining the profiled element 100 or acting as a secondary guide for the shading system.

Figure 6:
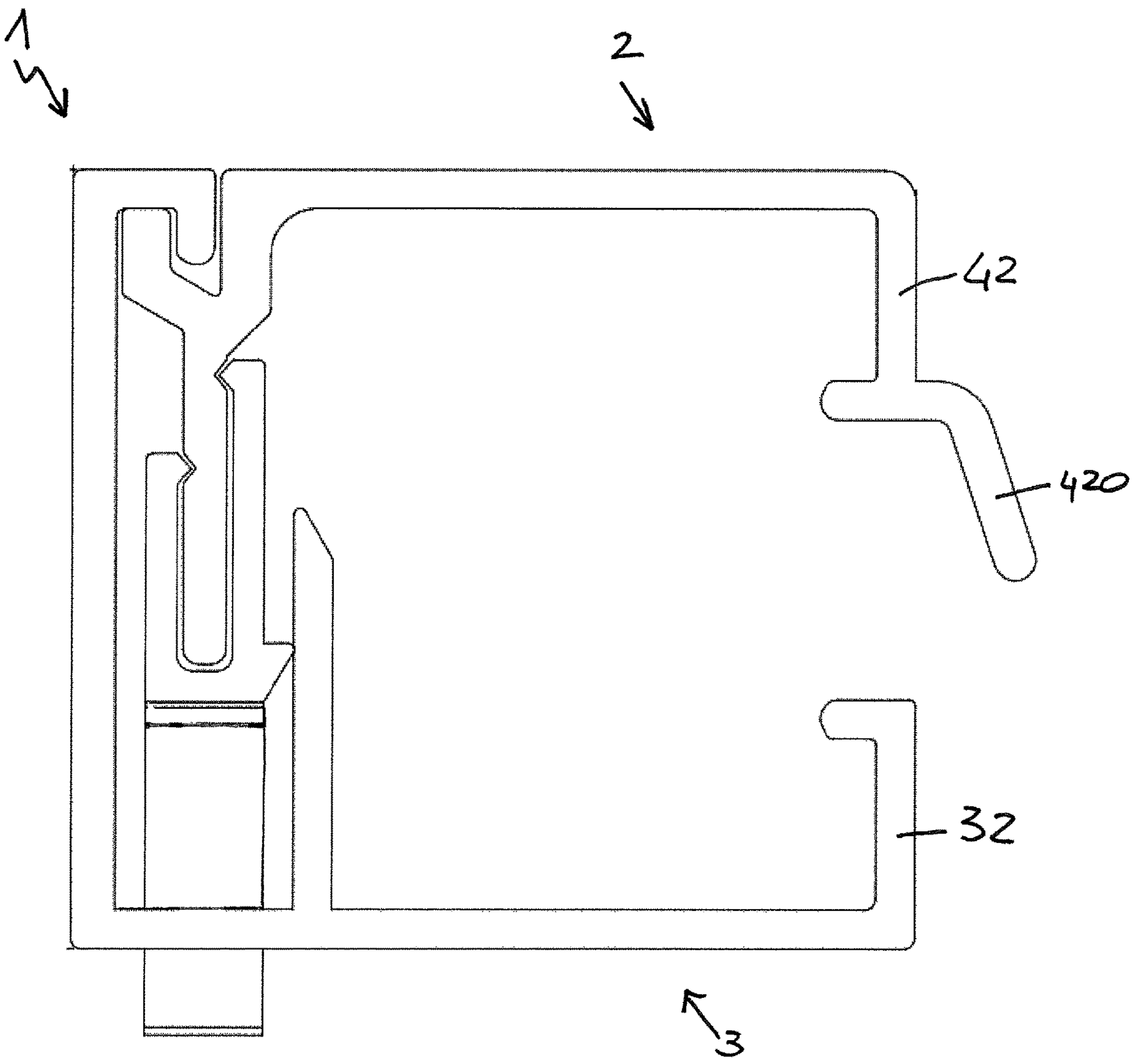

In the example of embodiment shown in FIG. 6, the upright is again provided with a single face 42 with extension 420. However, in this case, the face 42 is at 90° with respect to the side surface 43 and the extension 420 extends from the inset shoulder 42*b*, with an inclination of about 30° with respect to the face 42.

As already mentioned above, the elastic or cushioning means 200 may be mounted with a predefined or variable interval on the flange 41 of the removable face 2 or formed as one piece on the edge of the flange 41 at a predefined or variable interval, preferably at a distance of between 15 cm and 20 cm. Similarly a plurality of clips 1000 (FIG. 7) may be mounted on the profiled element 100 of the shading system, each clip being provided with a guide channel 13 on an edge 101 of the profile element and at least one flexible—plastic or metal—tongue 2200 which has one end on the channel 10 of the clip and an opposite end spaced therefrom for making contact with the upright. The tongue 2200 acts as a spring between the profiled element 100 and the upright, allowing the profiled element to be moved towards front faces 42, 32 of the upright, during compression, or be spaced at a predefined distance, when not compressed.

The scope of protection of the present invention also includes a cushioning device 200 (FIG. 2) for an upright 1 of a shading system, characterized in that it comprises fixing means 210, preferably a guide channel 210, for fixing the cushioning device to a removable sidewall 2 of the shading system, preferably for fixing the cushioning device to a flange 41 of the removable sidewall 2. The cushioning device also comprises a flexible—plastic or metal—tongue 220, which has one end on the channel 210 (i.e. on the means for fixing the cushioning device) and an opposite end spaced therefrom, for making contact with a non-removable sidewall 3 of the upright.

The tongue 220 is intended to act as a spring between the end wall 6 and a non-removable sidewall 3, allowing the removable sidewall 2 to be moved towards the non-removable sidewall 3 during assembly/disassembly or the removable sidewall 2 to be retained between the end wall 6 and the non-removable sidewall 3.

A removable sidewall 2 for an upright 1 of a shading system also falls within the scope of protection of the patent. The removable sidewall 2 comprises a face 42 intended to form the front profile of the upright and a lateral wall 43 which can be engaged with an end wall 6 of the upright. Preferably, engagement of the removable sidewall 2 and the end wall is performed by means of an undercut, even more particularly by means of a U-shaped section of the removable sidewall. A cushioning device 200 is mounted on the sidewall 2, preferably on a flange 41 of the sidewall 2 intended to remain close to the end wall 6, parallel thereto.

The embodiments indicated in the figures do not limit the scope of protection of the present invention. For example, even though in FIG. 4, the sidewalls are inclined at 90° with respect to the end wall 6 and form corners, it is possible to employ inclined arrangements or different forms, for example a surface curved from the end wall 6 to one or both the sidewalls 2, 3. Finally, the upright according to the present invention has further applications other than use for shading systems.

In particular, the Applicant has realized the particular advantages obtained from using the upright as a seat for a lighting system, for example for an LED or for an LED strip. For example, the upright 1 is mounted on an outside wall, inside wall or on a different mounting surface, by means of screws, double-sided or plain adhesive systems or glues. The LED strip may be mounted on the flange 41 of the removable sidewall 2, before inserting this sidewall into the upright. With a flange 41 of the type shown in FIG. 2, the LED strip emits light through the opening of the upright 10. The upright acts an optical guide. One or more reflecting surfaces may be mounted on the non-removable sidewall 3 and/or onto the end wall 6, in order to reflect the light emitted by the LEDs through the opening 10. The front faces 32, 42 and/or the sidewalls 2, 3 may be made of plastic material, which is optionally transparent and/or coloured, so as to emit light through the surface. The flange 41 may also comprise a surface which is parallel to the end wall and on which the elastic means are mounted, in the manner already described, and a surface for applying the LED strip, which is inclined with respect to the end wall 6. The upright, also in its variation of embodiment with lighting system, may be provided with all the structural characteristics which have been defined with reference to FIGS. 1-7 and therefore will not be further described.

Moreover, the lighting system may be remotely controlled, in terms of lighting intensity or for switching on and off, by means of a wireless system having a radio module associated with the lighting system (on the upright) and a radio module associated with a remote control.

Alternatively or in addition, the lighting system is associated with a light sensor which is programmed to switch the lighting system on or off depending on the amount of natural light detected inside the premises in which the upright is installed.

Only by way of example an embodiment is described below.

The shading cloth could be completely retracted allowing the light to pass through the opening (for example a window) situated between opposite vertical uprights or underneath a horizontal upright. During night-time hours or at dusk the sunlight, which may be very weak or absent, is detected by the light sensor which activates the lighting system incorporated in the upright. Activation may occur in particular when the sensor detects a natural light which is below a predefined threshold. Even more particularly, the lighting system may be activated with a light having a predefined (preferably) low intensity and predetermined colour, creating inside the house a diffused lighting during said evening hours.

The extension of the shading cloth may be controlled by further sensors mounted on the shading upright, and the intensity or colour of the lighting may be varied or the lighting system switched off depending on the extension of the cloth. For example a total extension of the lighting cloth may cause switching-off of the lighting system, resulting in total darkness of the environment; instead, a partial extension may cause a gradual reduction of the lighting intensity.

The invention claimed is:

1. An upright, comprising:

two sidewalls between which a profiled element for a shading system can be inserted;

an end wall between the two sidewalls;

an opening situated opposite the end wall;

wherein one of the two sidewalls is removable and the other of the two sidewalls is non-removable; and an elastic spring arranged between the removable sidewall and the non-removable sidewall in order to retain the removable sidewall between the end wall and the non-removable sidewall, wherein the elastic spring is extendible and compressible along an axis parallel to the end wall, the elastic spring is mounted on a flange of the removable sidewall, a major axis of the flange extending parallel to the end wall;

wherein the elastic spring comprises a flexible tongue configured to be compressed in order to perform operations for releasing and engaging the removable sidewall from or with the end wall and extended in order to fix the removable sidewall to the end wall; and wherein the elastic spring is mounted on the flange of the removable sidewall by a guide channel, formed as one piece with the elastic spring, the flexible tongue having one end located on the channel and an opposite end spaced therefrom and making contact with the non-removable sidewall.

2. The upright of claim 1, wherein the end wall comprises a profile for retaining the removable sidewall, and wherein the removable sidewall comprises a locating profile engaged with the retaining profile of the end wall.

3. The upright of claim 2, wherein the locating profile of the removable sidewall has a U-shaped section and is joined by snap-engagement inside an overturned U section of the retaining profile of the end wall.

4. The upright of claim 3, wherein the retaining profile comprises a raised lug projecting from the end wall is a base of the overturned U section being parallel to the non-removable sidewall and extending towards an opening of the upright, and a tooth extending towards the non-removable sidewall, parallel to a base of the end wall.

5. The upright of claim 3, wherein the locating profile of the removable sidewall comprises a tooth and a recess, the tooth being inserted inside the overturned U section of the end wall, and a tooth of the retaining profile of the end wall being engaged inside the recess.

6. The upright of claim 1, wherein the elastic spring is made of plastic or metallic material, formed as one piece with the removable sidewall or mounted thereon.

7. The upright of claim 1, wherein the guide channel comprises two opposite faces in contact with opposite surfaces of the flange, and a tip on at least one face which engages with a recess in the flange.

8. The upright of claim 1, further comprising a shoulder parallel to the end wall defining with the end wall a seat for the elastic spring and at least part of the flange, the shoulder projecting from the non-removable sidewall and terminating close to halfway along the end wall.

9. The upright of claim 1, wherein the removable sidewall comprises a front face that defines a front profile of the upright without holes, and the non-removable sidewall comprises a respective front face that defines another front profile of the upright without holes.

10. The upright of claim 9, wherein at least one of the front faces comprises a surface with an inclination greater than or equal to 90° with respect to a side surface of the respective sidewall.

11. The upright of claim 10, wherein the front faces of the upright form a profile for retaining the profiled element for the shading system.

12. The upright of claim 9, wherein the surface with an inclination greater than or equal to 90° extends as far as a slit in the profiled element where a shading cloth is mounted or to halfway along the end wall.

13. The upright of claim 1, further comprising a plurality of elastic springs that are mounted with a predefined or variable interval on the flange of the removable sidewall or are formed as one piece on the edge of the flange with a predefined or variable interval, the interval being between 15 cm and 20 cm.

14. The upright of claim 1, further comprising:

the profiled element of the shading system; and a plurality of clips, each clip of the plurality of clips provided with a guide channel mounted on an edge of the profiled element and at least one flexible tongue, formed from plastic or metal, having one end on the channel of the clip of each of the said plurality of clips and an opposite end spaced therefrom so as to make contact with the upright, the at least one flexible tongue acting as a spring between the profiled element and the upright, allowing the profiled element to move towards front faces of the upright during compression or to have a predefined spacing when not compressed.

* * * * *